(12) United States Patent
Fan et al.

(10) Patent No.: US 7,758,944 B1
(45) Date of Patent: Jul. 20, 2010

(54) OPTICAL MEDIUM AND METHOD FOR MAKING THE SAME

(75) Inventors: Kai Leung Fan, Hong Kong (CN); Ming Sang Yeung, Hong Kong (CN)

(73) Assignees: Dongguan Anwell Digital Machinery Co., Ltd. (CN); Anwell Precision Technology (HK) Limited, Hong Kong (HK)

( * ) Notice: Subject to any disclaimer, the term of this patent is extended or adjusted under 35 U.S.C. 154(b) by 787 days.

(21) Appl. No.: 11/463,226

(22) Filed: Aug. 8, 2006

(51) Int. Cl.
*B32B 3/02* (2006.01)
(52) U.S. Cl. ............ 428/64.4; 428/64.8; 430/270.14
(58) Field of Classification Search .......... None
See application file for complete search history.

(56) References Cited

U.S. PATENT DOCUMENTS

| 6,735,166 B1 * | 5/2004 | Kusafuka et al. ......... 369/275.3 |
| 2003/0169679 A1 * | 9/2003 | Usami et al. ............... 369/280 |

* cited by examiner

*Primary Examiner*—Elizabeth Mulvaney
(74) *Attorney, Agent, or Firm*—Wuxi Sino IP Agency, Ltd.; Joe Zheng

(57) ABSTRACT

Improved structures of optical medium are disclosed. According to one embodiment, multiple reflective layers are used. These reflective layers are in different materials. At least one of the reflective layers allowing a significant amount of a laser beam to transmit is used to protect another reflective layer with superior reflectivity from moisture on one side. An additional reflective layer may also be used to protect the high reflective layer from moisture on the other side.

16 Claims, 2 Drawing Sheets

OPTICAL MEDIUM AND METHOD FOR MAKING THE SAME

BACKGROUND OF THE INVENTION

1. Field of the Invention

The invention is generally related to the area of optical information recordable medium. More particularly, the present is related to structures for optical medium for carrying or recording digital information and method for making such optical medium.

2. The Background of Related Art

One of the most popular optical storage medium is DVD (Digital Versatile Disc). Technically, DVD is a relatively new generation of optical disc storage technology. It is much larger in data capacity and faster in reading than CD and can hold cinema-like video, better-than-CD audio, still photos, and computer data. DVD aims to encompass home entertainment, computers, and business information with a single digital format. It has replaced laserdisc, is well on the way to replacing videotape and video game cartridges, and could eventually replace audio CD and CD-ROM. DVD has widespread support from all major electronics companies, all major computer hardware companies, and all major movie and music studios. With this unprecedented support, DVD became the most successful storage device of all time in the history of optical storage technologies.

With the popularity of various multimedia applications and data, blank DVD, also called DVDR (i.e., DVD Recordable), is becoming probably the most desirable recordable medium. Users may use DVDR to preserve their own data (e.g., movies, music, and photos). In principle, a DVDR is a blank DVD with a piece of medium that is writable with a laser beam. Data on the same disk can also be read out by the laser beam. Because of the relatively low in cost, DVDR is gaining great popularity among all uses, professional or armature alike.

FIG. 1 shows a cross section view of a structure 100 of a traditional DVDR. As illustrated, there are six layers in a DVDR, a first substrate 10, a dye recording layer 20, a reflective layer 30, an adhesive layer 40, a second substrate 50 and a labeling layer 60. A DVDR is essentially formed by stacking or integrating these six layers on top of each other.

From a user perspective, the labeling layer 60, being a first layer, is for labeling purpose. The labeling layer 60 allows a user to write thereon or is printed to indicate the content therein or the data capacity a disk has. A second layer is the second substrate 50 made of, for example, polycarbonate. The second layer is typically relatively thick and provides the physical strength and support of the disk. The third layer is the adhesive layer 40 that is formed by, for example, UV curable glue. Besides protecting the dye recording layer 20 and the reflective layer 30, the third layer bonds the first substrate 10 and the second substrate 50 together. The fourth layer is the reflective layer 30 to reflect a laser beam. In general, the reflective layer 30 is made out of a reflective material, such as silver with 99.99% purity. The fifth layer is the dye recording layer 20 that records and preserves data. Accordingly, the dye recording layer 20 affects substantially the quality of a disk. The sixth layer is the first substrate 10 supporting the dye recording layer 20 and the reflective layer 30. The first substrate 10 and the second substrate 50 are bonded together to hold both the reflective layer 30 and the dye recording layer 20 therebetween to form a disc (with the labeling layer).

Given the structure 100 of the traditional DVDR, the manufacturing process may be summarized as follows: providing a first substrate, forming a dye recording layer on the substrate, metalizing the dye recording layer in vacuum to form a reflective layer, then applying a type of adhesive to bond with another substrate to form a disk. A printing layer is applied on top of the disk. In other words, there are five essential steps in manufacturing a DVDR disk, there are molding (to create the substrates), dyeing (to create a dye recording layer), metalizing (to form a reflective layer), bonding (to bond all together), and printing (labeling the final disk).

Metalizing is a very important part of the manufacturing process. It laminates a substrate with a layer of reflective material that reflects a laser beam to read data from the disc or write data into the disc. To facilitate the reading by laser, the material used as the reflective material shall have superior reflectivity, otherwise a reflected light beam would be too weak to read off the data on the disk or write data into the disk. It is known that the wavelength of a laser beam for DVDR is 650 nm. At the wavelength, silver has the highest reflectivity, approaching 98.9% while gold has a reflectivity of 95.5%, copper has a reflectivity of 96.6% and aluminum has a reflectivity of 90.5%. Accordingly, silver is more appropriate than others.

In manufacturing DVDR disks, there is a tremendous requirement for the dryness of the dye recording layer. Practically, it is difficult to have the dye recording layer that is completely dry. There may be a certain level of moisture in the dye material. When the dye recording layer is laminated with a reflective material (e.g., silver), the material could react to the moisture in the dye recording layer, causing bubbles, voids and undesirable results. As a result, the quality of a resultant disc is compromised. The disk may be completely inferior or downgraded, thus increasing the manufacturing cost.

On the other end, the moisture in the adhesive (e.g., glue) applied to bond the substrates may also cause chemical erosion to the silver, thus causing bubbles where air trapped in the bubbles can oxidize silver, leading to voids after sometime. When a disc with bubbles is being read at high spinning speed in a disk drive, the layers in the disc intend to split under the centrifugal force of the spinning. As a result, the stability and lifespan of the disk are affected, and a reading device may be ruined.

There thus a need for improved structures of optical medium (e.g., DVD or DVDR) that can overcome the problems commonly seen in the traditional DVDR.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques for producing optical medium that can be read at substantially high speeds with greater stability and accuracy, and reduce manufacturing costs. According to one aspect of the present invention, multiple reflective layers are used. These reflective layers are in different materials. At least one of the reflective layers allowing a significant amount of a laser beam to transmit is used to protect another reflective layer with superior reflectivity from moisture on one side. An additional reflective layer may also be used to protect the high reflective layer from moisture on the other side.

According to one embodiment, there are three reflective layers in a disc. The middle reflective layer to be protected by the other two reflective layers is in silver material. The other two reflective layers may be in gold or bronze. Because all the reflective layers are in different metal materials so that resultant discs remain metallic and expensive looking. There are numerous functions, benefits and advantages in the present invention, one of them is that the present invention provides new structures of optical medium using multiple reflective layers in a disc.

The present invention may be implemented as method, process, or apparatus. According to one embodiment of the present invention, the present invention is a method for producing an optical disc, the method comprises providing a first substrate and a second substrate, laminating the first substrate with a dye recording layer and at least two different reflective layers, wherein the two different reflective layers are in two different materials; and bonding the laminated first substrate with the second substrate with an adhesive layer formed therebetween to produce a disk. With a labeling layer on top of the disk, the complete optical disc is produced.

According to another embodiment of the present invention, the present invention is an optical disc comprising: a first substrate and a second substrate, a dye recording layer, at least first and second reflective layers, wherein the dye recording layer and the at least first and second reflective layers are sandwiched between the first substrate and the second substrate via an adhesive layer. The optical disc further comprises a labeling layer.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

The detailed description of the present invention is presented largely in terms of procedures, steps, logic blocks, processing, or other symbolic representations that directly or indirectly resemble the manufacturing processing and optical medium. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 1:
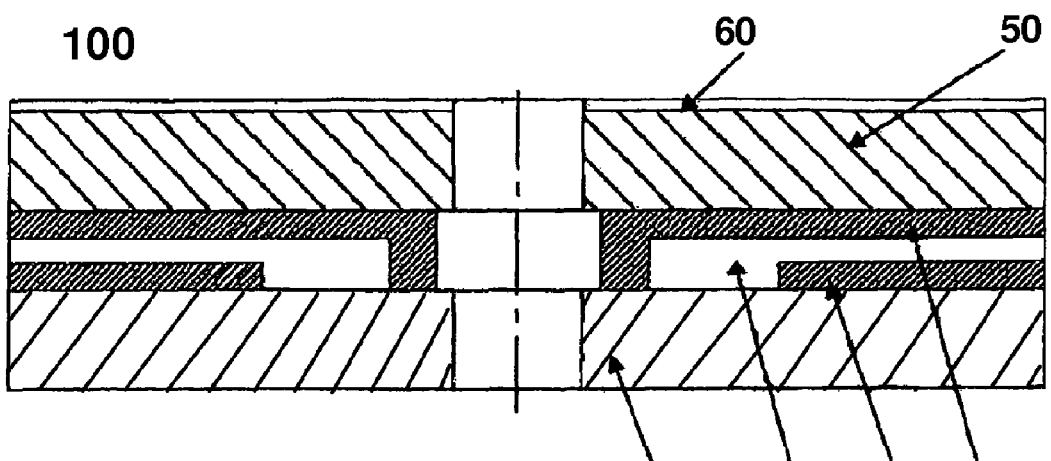
FIG. 1 shows a cross section view of a structure of a traditional DVDR.
Figure 2:
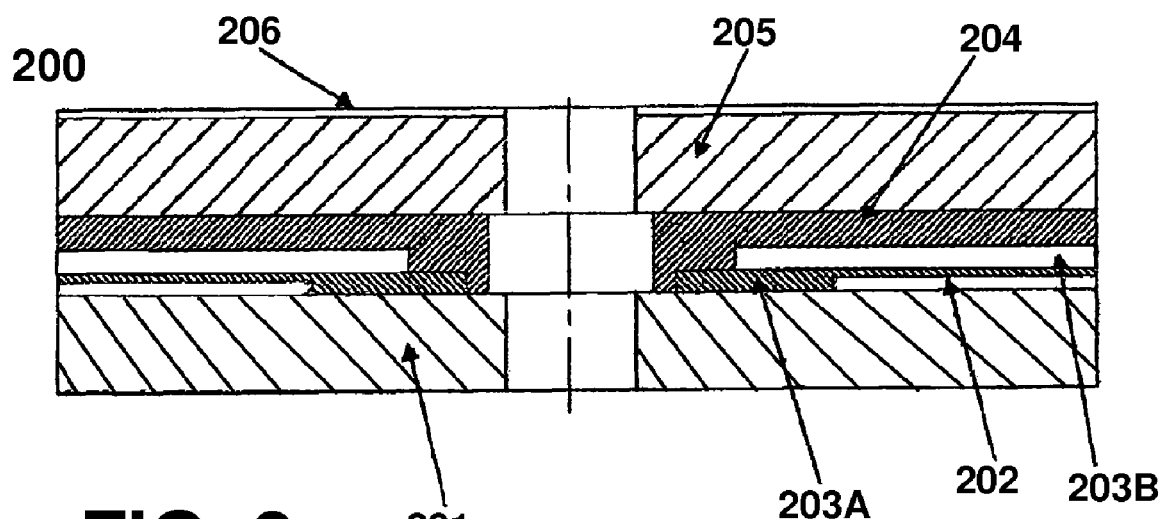
FIG. 2 shows a cross section view of a structure of an optical disk according to one embodiment of the present invention.

Referring now to the drawings, in which like numerals refer to like parts throughout the several views. FIG. 2 shows a cross section view of a structure of an optical disk 200 according to one embodiment of the present invention. As illustrated, there are seven layers in the optical disk 200, a first substrate 201, a dye recording layer 202, a first reflective layer 203A, a second reflective layer 203B, an adhesive layer 204, a second substrate 205 and a labeling layer 206.

One of the important features in the present invention is the use of multiple reflective layers in different materials. According to one embodiment, the structure of an optical disk 200 uses two reflective layers 203A and 203B. The first reflective layer 203A is laminated substantially on top of the first substrate 201 that has already been laminated with a dye recording layer 202, and the second reflective layer 203B is laminated substantially on top of the first reflective layer 203A. The adhesive layer 204 is essentially formed on top of the second reflective layer 203B to bond the first substrate 201 and the second substrate 205 to sandwich all the layers therebetween.

In one embodiment, the first reflective layer 203A is made of gold, and the second reflective layer 203B is made of silver (hence a silver layer). To prevent the silver from being chemically affected by moisture (e.g., from the dye recording material), the first reflective layer 203A is provided to isolate the second reflective layer 203B from the dye recording layer 202 in a sense that moisture from the dye recording layer 202 is stopped by the first reflective layer 203A, where the first reflective layer 203A is generally from a material (e.g., gold) that is resistant to moisture. In that embodiment, the thickness of the silver layer is controlled between 10-30 nm, and the thickness of the protecting reflective layer 203A is controlled between 50-80 nm.

In another embodiment, the first reflective layer 203A is made of silver (hence a silver layer), and the second reflective layer 203B is made of gold. To prevent the silver from being chemically affected by moisture (e.g., from the adhesive), the second reflective layer 203B is provided to isolate the first reflective layer 203A from the adhesive layer 204 in a sense that moisture from the adhesive layer 204 is stopped by the second reflective layer 203B, where the second reflective layer 203B is generally from a material (e.g., gold) that is resistant to moisture.

There are a lot of materials that are resistant to moisture. In one embodiment, the material to protect the silver layer is gold, bronze or copper. As a result, the final optical disk still looks metallic through the substrate 201 or 205 that is in general transparent (e.g., polycarbonate).

Figure 3:
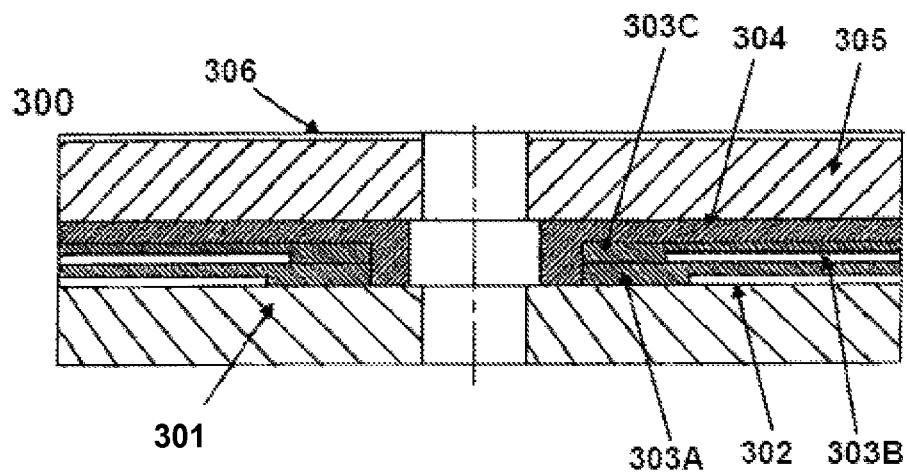
FIG. 3 shows a cross section view of another structure of an optical disk according to one embodiment of the present invention.

FIG. 3 shows a cross section view of another structure of an optical disk 300 using more than two reflective layers, according to one embodiment of the present invention. As illustrated, there are at least eight layers in the optical disk 300, a first substrate 301, a dye recording layer 302, a first reflective layer 303A, a second reflective layer 303B, a third reflective layer 303C, an adhesive layer 304, a second substrate 305 and a labeling layer 306.

As shown, the structure of an optical disk 300 uses three reflective layers 303A, 303B and 303C. The first reflective layer 303A is laminated substantially on top of the first substrate 301 that has already been laminated with a dye recording layer, the second reflective layer 303B is laminated substantially on top of the first reflective layer 303A, and the third reflective layer 303C is laminated substantially on top of the second reflective layer 303B. The adhesive layer 304 is essentially formed on top of the third reflective layer 303C.

According to one embodiment, the first reflective layer 303A is made out of gold, the second reflective layer 303B is made out of silver, and the third reflective layer 303C is made out of bronze or copper. In terms of area, the first reflective layer 303A is larger than the dye recording layer so that the dye recording layer is completely protected while the second reflective layer is between the first reflective layer and the dye recording layer, and that the second reflective layer 303B is close to the first reflective layer 303A. In one embodiment, the thickness of the three reflective layers is collectively between 80-120 nm.

Figure 4:
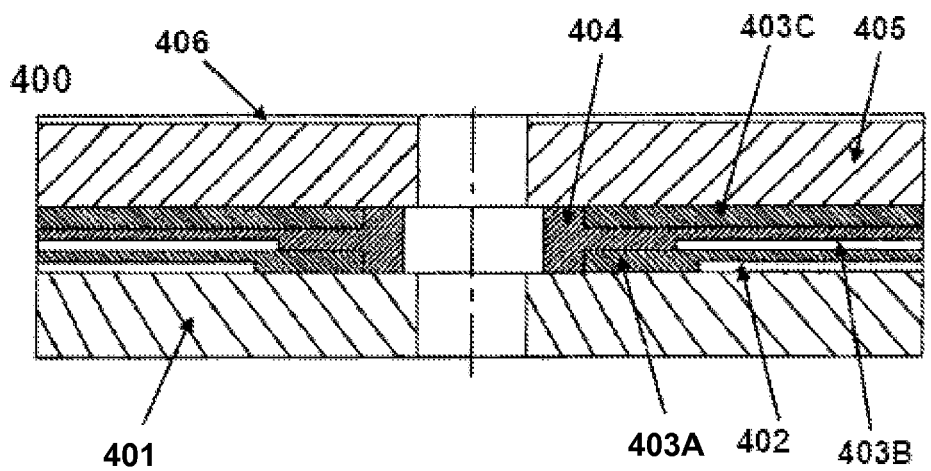
FIG. 4 shows a cross section view of another structure of an optical disk according to one embodiment of the present invention.

FIG. 4 shows a cross section view of another structure of an optical disk 400 according to one embodiment of the present invention. As illustrated, there are at least eight layers in the optical disk 400, a first substrate 401, a dye recording layer 402, a first reflective layer 403A, a second reflective layer 403B, a third reflective layer 403C, an adhesive layer 404, a second substrate 405 and a labeling layer 406.

As shown, the structure of an optical disk 400 uses three reflective layers 403A, 403B and 403C. The first reflective layer 403A is laminated substantially on top of the first substrate 401 that has already been laminated with a dye recording layer 402, the second reflective layer 403B is laminated substantially on top of the first reflective layer 403A, and the third reflective layer 403C is laminated substantially on back of the second substrate 405. The adhesive layer 404 is essentially formed between the laminated first and second substrates 401 and 405 to bond the two substrates together.

According to one embodiment, the first reflective layer 403A is made out of gold, the second reflective layer 403B is made out of silver, and the third reflective layer 403C is made out of bronze or copper. In terms of area, the first reflective layer 403A is larger than the dye recording layer so that the dye recording layer is completely protected while the second reflective layer is between the first reflective layer and the dye recording layer, the third reflective layer is similar to the first reflective layer. In one embodiment, the thickness of the three reflective layers is collectively between 80-120 nm.

In operation, after a dye recording layer is laminated on the first substrate (L0), the first substrate is metalized in a vacuum chamber when a pre-determined vacuum level is reached. A reflective material (e.g., silver) with desired reflectivity is evaporated and then condensed evenly on the part that needs to be metalized at a regulated rate. The thickness of the first silver reflective layer is controlled between 10-30 nm and covers completely the dye recording layer. In the case of the optical medium being a DVDR, the inner diameter of the first silver reflective layer is smaller than that of the dye recording layer. In other words, the area of the first silver reflective layer is larger than that of the dye recording layer.

The second reflective layer is laminated onto the laminated first substrate (now with the dye recording layer and the silver layer) by, for example, vacuum metalizing. The thickness of the second reflective layer may be controlled between 50-80 nm depending on application. The inner diameter of the second reflective layer is between that of the first reflective layer and that of the dye recording layer. In other words, the area of the second reflective layer is between the areas of the first reflective layer and that of the dye recording layer. The glue layer is formed, perhaps by a processing of spinning a certain amount of glue deposed on the second reflective layer or between the laminated first substrate and the second substrate to form a disc. After forming a printing layer on top of the disc, a complete disc is done.

It can be appreciated that in one embodiment the second reflective layer (i.e., the silver layer) is isolated from the dye recording layer by the first reflective layer (e.g., the gold) and isolated from the adhesive layer by the third layer (e.g., the bronze). As a result, the dye recording layer can be protected from possible moisture that may exist in the dye recording layer and the adhesive layer, thus improving the quality of a disk and still keeping the disk appear metallic.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the present invention may be applied to non-disk like optical medium. Accordingly, the scope of the present invention is defined by the appended claims rather than the foregoing description of embodiments.

We claim:

1. A method for producing an optical disc, the method comprising:

providing a first substrate and a second substrate;

laminating the first substrate with a dye recording layer and at least two different reflective layers, a first reflective layer and a second reflective layer, wherein the second reflective layer is disposed on top of the first reflective layer that is extended beyond the second reflective layer to enclose the dye recording layer to prevent the second reflective layer from being chemically affected from the dye recording layer, and the first and the second reflective layers are in two different materials; and bonding the laminated first substrate with the second substrate with an adhesive layer formed therebetween to produce a disk, wherein the adhesive layer is in contact with both the first and the second reflective layers.

2. The method as recited in claim 1, further comprising laminating the disk with a labeling layer to form the optical disc, and wherein the laminated first substrate further includes a third reflective layer on top of the second reflective layer and is extended to enclose the second reflective layer with the first reflective layer, the adhesive layer is also in contact with the third reflective layer.

3. The method as recited in claim 1, wherein the first reflective layer separates the second reflective layer from the dye recording layer in a sense that possible moisture in the dye recording layer does not reach the second reflective layer.

4. The method as recited in claim 3, wherein a thickness of the first reflective layer is thin enough to transmit a significant portion of a laser beam coming though the first substrate and the dye recording layer.

5. The method as recited in claim 3, wherein the first reflective layer is more resistant to the moisture than the second reflective layer.

6. The method as recited in claim 5, wherein the first reflective layer and the second reflective layer are made out of gold and silver, respectively.

7. A method for producing an optical disc, the method comprising:

providing a first substrate and a second substrate;

forming a dye recording layer on top of the first substrate;

metalizing a first reflective layer substantially on top of the dye recording layer, the first reflective layer being extended to enclose the dye recording layer;

metalizing a second reflective layer substantially on top of the first reflective layer, the second reflective layer being smaller than the first reflective layer in size;

metalizing a third reflective layer substantially on top of the second reflective layer and extended beyond the second reflective layer so that a laminated substrate is formed; and bonding the laminated substrate with the second substrate with an adhesive layer formed therebetween to produce a disk, wherein, as areas of the first reflective layer and the third reflective layer are similar but larger than that of the second reflective layer, the adhesive layer is in contact with each of the first, second and third reflective layers.

8. A method for producing an optical disc, the method comprising:

providing a first substrate and a second substrate;

forming a dye recording layer on top of the first substrate;

metalizing a first reflective layer substantially on top of the dye recording layer, the first reflective layer being extended to enclose the dye recording layer;

metalizing a second reflective layer substantially on top of the first reflective layer to produce a first laminated substrate, wherein the second reflective layer is smaller than the first reflective layer in size;

metalizing a third reflective layer substantially on top of the second substrate to produce a second laminated substrate; and bonding the laminated first and laminated second substrates with an adhesive layer formed therebetween to produce a disk, wherein, as areas of the first reflective layer and the third reflective layer are similar but larger than that of the second reflective layer, the adhesive layer is in contact with each of the first, second and third reflective layers.

9. An optical disc comprising:

a first substrate and a second substrate;

a dye recording layer disposed on most of the first substrate;

first and second reflective layers, wherein the dye recording layer and the first and second reflective layers are sandwiched between the first substrate and the second substrate via an adhesive layer, and an area of the first reflective area is extended beyond the dry recording layer to reach the first substrate while the second reflective layer only extends on top of the first reflective area, wherein the adhesive layer is in contact with both the first and the second reflective layers.

10. The optical disc as recited in claim 9, further comprising a labeling layer to form the optical disc.

11. The optical disc as recited in claim 9, wherein the first reflective layer separates the second reflective layer from the dye recording layer in a sense that possible moisture in the dye recording layer can not reach the second reflective layer.

12. The optical disc as recited in claim 11, wherein a thickness of the second reflective layer is thin enough to transmit a significant portion of a laser beam coming though the first substrate and the dye recording layer.

13. The optical disc as recited in claim 11, wherein the first reflective layer is more resistant to the moisture than the second reflective layer.

14. The optical disc as recited in claim 13, wherein the first reflective layer and the second reflective layer are made out of gold and silver, respectively.

15. The optical disc as recited in claim 9, wherein the laminated first substrate further include a third reflective layer that prevents the second layer from possible moisture in the adhesive layer.

16. The optical disc as recited in claim 15, appearing metallic.

* * * * *